(12) United States Patent
Fink et al.

(10) Patent No.: US 11,002,373 B2
(45) Date of Patent: May 11, 2021

(54) DEVICE AND METHOD OF PREPARING SALT-CONTAINING WATER BY REVERSE OSMOSIS

(71) Applicant: BWT AQUA AG, Aesch (CH)

(72) Inventors: Marc Fink, Lörrach (DE); Jürgen Johann, Nußloch (DE); Mathias Schwaiger, Lochen am See (AT)

(73) Assignee: BWT AQUA AG, Aesch (CH)

( * ) Notice: Subject to any disclaimer, the term of this patent is extended or adjusted under 35 U.S.C. 154(b) by 166 days.

(21) Appl. No.: 16/476,920

(22) PCT Filed: Jan. 13, 2017

(86) PCT No.: PCT/EP2017/050708
§ 371 (c)(1),
(2) Date: Jul. 10, 2019

(87) PCT Pub. No.: WO2018/130303
PCT Pub. Date: Jul. 19, 2018

(65) Prior Publication Data
US 2019/0331240 A1    Oct. 31, 2019

(51) Int. Cl.
*F16K 11/07* (2006.01)
*B01D 61/02* (2006.01)
(Continued)

(52) U.S. Cl.
CPC ........ *F16K 11/0716* (2013.01); *B01D 61/025* (2013.01); *B01D 61/08* (2013.01);
(Continued)

(58) Field of Classification Search
CPC   C02F 1/441; C02F 2103/08; C02F 2201/005; C02F 2201/006;
(Continued)

(56) References Cited

U.S. PATENT DOCUMENTS 4,476,015 A   10/1984   Schmitt et al.
4,741,823 A    5/1988   Olsen et al.
(Continued)

FOREIGN PATENT DOCUMENTS

EP       2 639 203 A1    9/2013
JP       2001-149933 A   6/2001
(Continued)

OTHER PUBLICATIONS

Notice of Reason for Rejection dated Oct. 2, 2020, of counterpart Japanese Application No. 2019-536259, along with an English translation.

*Primary Examiner* — Waqaas Ali
(74) *Attorney, Agent, or Firm* — DLA Piper LLP (US)

(57) ABSTRACT

An apparatus that treats salt-containing water by reverse osmosis, in which the salt-containing water is separated into a permeate stream and a concentrate stream, includes an inlet for the salt-containing water; an outlet for the permeate; an outlet for the concentrate, and a reverse osmosis device, wherein the inlet and the outlets are integrated into a base unit adapted for installation in a positionally fixed manner, and the reverse osmosis device is an exchangeable unit detachably connected to the base unit.

16 Claims, 4 Drawing Sheets

(51) Int. Cl.
*B01D 61/08* (2006.01)
*B01D 61/12* (2006.01)
*C02F 1/44* (2006.01)
*C02F 103/08* (2006.01)

(52) U.S. Cl.
CPC .............. *B01D 61/12* (2013.01); *C02F 1/441* (2013.01); *F16K 11/0712* (2013.01); *B01D 2313/083* (2013.01); *B01D 2313/18* (2013.01); *B01D 2313/21* (2013.01); *B01D 2313/44* (2013.01); *C02F 2103/08* (2013.01); *C02F 2201/005* (2013.01); *C02F 2201/006* (2013.01); *C02F 2201/007* (2013.01); *C02F 2301/043* (2013.01); *C02F 2307/12* (2013.01)

(58) Field of Classification Search
CPC .......... C02F 2201/007; C02F 2301/043; C02F 2307/12; B01D 61/025; B01D 61/08; B01D 61/12; B01D 2313/083; B01D 2313/18; B01D 2313/21; B01D 2313/44; B01D 2311/16; F16K 11/0716; F16K 11/0712; Y02A 20/131
See application file for complete search history.

(56) References Cited

U.S. PATENT DOCUMENTS

| | | | |
|---|---|---|---|
| 6,436,282 B1 * | 8/2002 | Gundrum | ............... B01D 61/08 |
| | | | 210/117 |
| 9,162,187 B2 | 10/2015 | Volker | |
| 9,937,468 B2 | 4/2018 | Pavan et al. | |
| 2010/0307965 A1 | 12/2010 | Volker | |
| 2012/0234770 A1 | 9/2012 | Goodwin | |
| 2013/0240446 A1 | 9/2013 | Pavan et al. | |
| 2014/0262989 A1 | 9/2014 | Pimentel et al. | |
| 2014/0319033 A1 * | 10/2014 | Shaffer | ................ B01D 35/147 |
| | | | 210/136 |

FOREIGN PATENT DOCUMENTS

| | | |
|---|---|---|
| JP | 2008-68243 A | 3/2008 |
| JP | 2009-052677 A | 3/2009 |
| KR | 20-0433506 Y1 | 12/2006 |
| WO | 2009/036717 A2 | 3/2009 |
| WO | 2015/038719 A1 | 3/2015 |

\* cited by examiner

DEVICE AND METHOD OF PREPARING SALT-CONTAINING WATER BY REVERSE OSMOSIS

TECHNICAL FIELD

This disclosure relates to an apparatus and a method of treating salt-containing water by reverse osmosis in which the water is separated into a permeate stream and a concentrate stream.

BACKGROUND

In many areas of industry and numerous commercial areas, desalinated water is required, for example, in power plants that produce steam, in baking ovens that fill the baking space with steam, in air-conditioning systems for evaporation cooling and in commercial dishwashers that avoid limescale deposits on the washware.

Technically, desalinated water is usually produced by reverse osmosis. Reverse osmosis is a membrane separation method in which a salt-containing untreated water stream, often also referred to as a feed stream, is guided along a semipermeable membrane under pressure. The pressure is usually generated by a pump, the so-called feed pump. Some of the water penetrates through the membrane, whereas a large portion of the salts dissolved in the water is kept back by the membrane. The water desalinated by reverse osmosis is referred to as permeate. The salt-containing residual water is referred to as concentrate.

Reverse osmosis generally produces a permeate with an electrical conductivity of 5 µS/cm to 50 µS/cm. According to the membrane type used and in dependence on the parameters (pressure, temperature) under which the method is carried out, permeate that is salt-free to a greater or lesser extent is obtained.

Conventional apparatuses that carry out reverse osmosis require not only a feed pump but frequently also a controller to automatically carry out backflushing processes. To prevent fouling and scaling processes, it is frequently also necessary for technically complex measures, for example, the addition of complex-forming chemicals or other pretreatment steps, to be carried out. For these reasons, the use of reverse osmosis apparatuses in private households has hitherto been the exception rather than the rule.

It could therefore be helpful to provide a universally usable solution for treating salt-containing water, in particular tap water and should be able to be used both in industry and the commercial sector and in private households and should be based on the reverse osmosis principle. It could also be helpful to achieve a reduction in the salt content of the water to be treated of more than 90% and a variation in the quality of the water treated.

SUMMARY

We provide an apparatus that treats salt-containing water by reverse osmosis, in which the salt-containing water is separated into a permeate stream and a concentrate stream, including an inlet for the salt-containing water; an outlet for the permeate; an outlet for the concentrate, and a reverse osmosis device, wherein the inlet and the outlets are integrated into a base unit adapted for installation in a positionally fixed manner, and the reverse osmosis device is an exchangeable unit detachably connected to the base unit.

DETAILED DESCRIPTION

Figure 1:
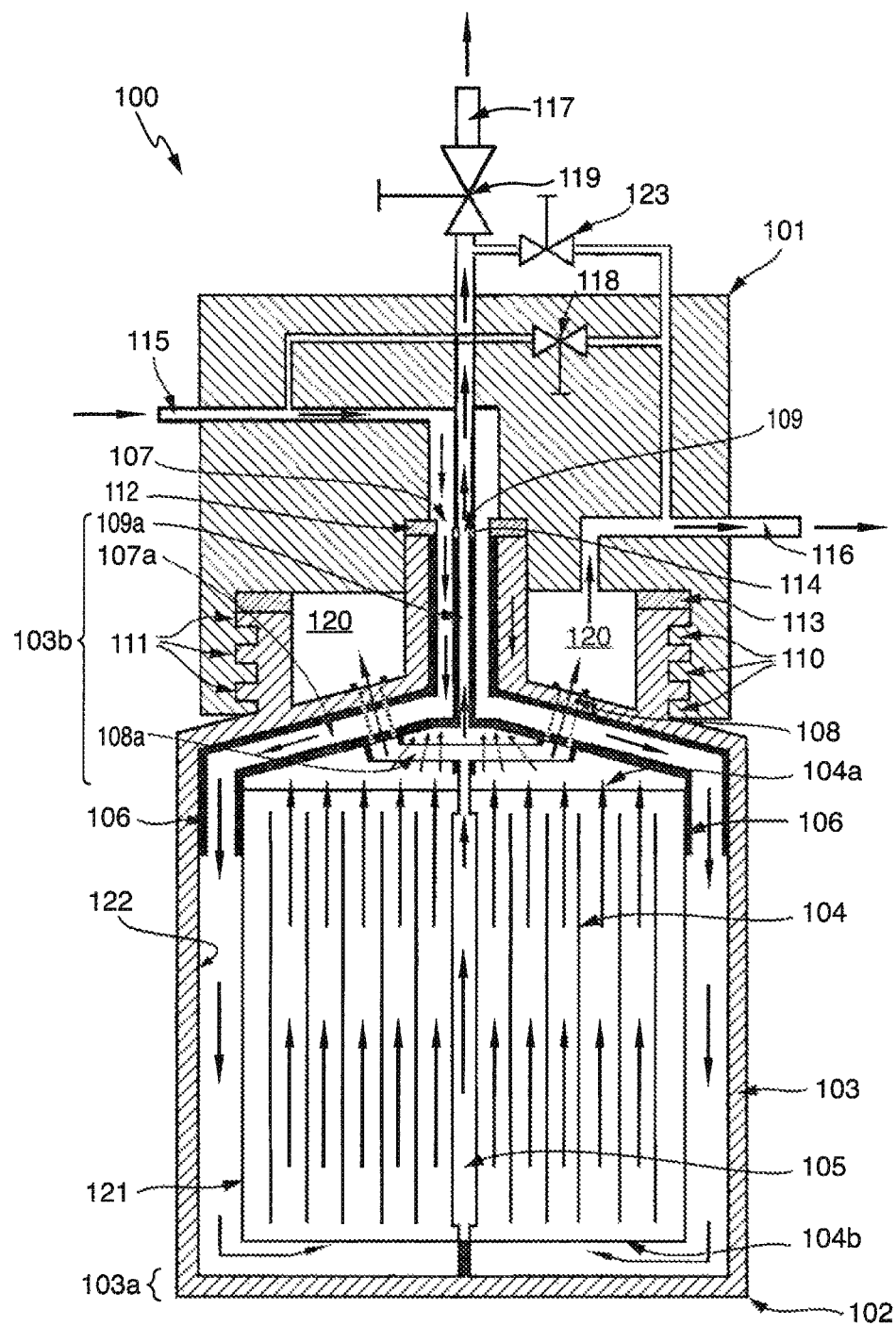
FIG. 1 is a schematic cross-sectional illustration of a preferred example of an apparatus.

Like all generic apparatuses that treat salt-containing water by separation of the water into a permeate stream and a concentrate stream, our apparatus is characterized by the following features:

an inlet for the salt-containing water to be treated,
an outlet for the permeate,
an outlet for the concentrate, and
a reverse osmosis device.

Our apparatus in particular treats tap water.

Our apparatus is characterized in particular in that the inlet and the outlets are integrated into a base unit able to be installed in a positionally fixed manner, and the reverse osmosis device is provided as an exchangeable unit detachably connected to the base unit.

Such an apparatus may be used not only in the industrial and commercial sector, but in particular also in private households, for example, in the treatment of water for coffee or providing water for hot-air steamers. Their particular suitability for this purpose stems from their simple construction in conjunction with the exchangeable reverse osmosis device. The membrane of a reverse osmosis device is also subjected to fouling and scaling processes. Complex maintenance mechanisms are not required, however. If a membrane of the reverse osmosis device provided as an exchangeable unit is excessively soiled due to fouling and scaling processes, the reverse osmosis device is simply replaced. The exchanging process is extremely simple due to the modularity of the apparatus. Prior to the initial start-up of the apparatus, the base unit is installed, for example, fixedly installed in a drinking water line. The base unit is then no longer affected by an exchange at a later stage of the reverse osmosis device. The exchange can correspondingly be performed without any problems, even by non-specialists.

To allow simple installation of the base unit, the base unit preferably has a holder, with at least one, preferably with two or more, bores, or else a seat for such a holder.

To allow simple replacement of the reverse osmosis device, preferably, the base unit that is able to be installed in a positionally fixed manner has a receptacle for the exchangeable unit, preferably a receptacle into which the exchangeable unit can be screwed. Preferably, the receptacle has an inner thread and the exchangeable unit has a matching outer thread.

Other technical possibilities for the detachable connection of the base unit and the exchangeable unit are also possible, for example, a snap connection.

The exchangeable unit preferably comprises a pressure vessel as part of the reverse osmosis device. The latter is particularly preferably of cylindrical form and has a bottom and a top part. Preferably, the bottom of the pressure vessel is closed, while an inlet opening for the salt-containing water, an outlet opening for the permeate and an outlet opening for the concentrate are integrated into the top part. Preferably, the top part and the base unit are formed such that the inlet opening is coupled to the inlet for the salt-containing water and the outlet openings are coupled to the outlets for the permeate and the concentrate when the reverse osmosis device is connected to the base unit. The salt-containing water to be treated thus then enters via the inlet into the base unit and is fed via the inlet opening into the reverse osmosis device. Permeate and concentrate formed in the reverse osmosis device depart from the latter via the respective outlet openings and, after passing through the base unit, exit the base unit via the outlets for the permeate and the concentrate.

The reverse osmosis device is preferably one with a wound structure. It preferably has a reverse osmosis membrane wound around a perforated tube serving for the collection and removal of permeate (permeate collecting tube for short). In such reverse osmosis devices, preferably, a membrane pocket adhesively bonded or welded on both sides is connected at its open end to the permeate collecting tube and wound around the tube. Spacer matter both within the membrane pocket and between the wound layers of the membrane pocket allow the supply and removal of water on the permeate side and on the concentrate side.

Particularly preferably, the membrane is provided in the form of a cylindrical winding having two end-side ends, the ends also being referred to below as first and second end sides. The winding is preferably arranged within the pressure vessel such that the first end side faces in the direction of the top part and the second end side faces in the direction of the bottom.

Preferably, an adaptor is mounted on the first end side of the wound reverse osmosis membrane, via which adaptor the reverse osmosis membrane is, together with the permeate collecting tube, coupled to the top part of the pressure vessel. The adaptor may be of single-part or multi-part form.

It is preferable for the first end side of the wound reverse osmosis membrane to be coupled via the adaptor to the inlet opening for the salt-containing water in the top part of the pressure vessel. It is thus possible for salt-containing water entering into the reverse osmosis device to flow to the first end side. From there, the water flows through the winding axially in the direction of the second end side. This results in the separation into the permeate and the concentrate mentioned in the introduction. While the permeate enters into the permeate collecting tube and is removed via the latter, the concentrate exits from the second end side of the cylindrical winding.

It is furthermore preferable for the second end side of the wound reverse osmosis membrane to be coupled via the adaptor to the outlet opening for the concentrate. For this purpose, the adaptor provides a suitable outlet channel, via which concentrate exiting from the second end side is supplied to the outlet opening. Consequently, concentrate exiting from the second end side is able to depart via the outlet opening from the reverse osmosis device in the direction of the outlet, integrated into the base unit, for the concentrate. For example, the concentrate may, for this purpose, be supplied via a line or a gap between the casing of the cylindrical winding and an inner wall of the pressure vessel to a corresponding inflow in the adaptor, which inflow opens into the outlet opening for the concentrate.

Alternatively and particularly preferably, it is also possible for the inlet opening for the salt-containing water in the top part of the pressure vessel to be coupled via the adaptor to the second end side of the wound reverse osmosis membrane. The salt-containing water may, for this purpose, be supplied via a line or a gap between the casing of the cylindrical winding and an inner wall of the pressure vessel to the second end side. It is thus possible for salt-containing water entering into the reverse osmosis device to flow to the second end side. From there, the water flows through the winding axially in the direction of the first end side. This results in the separation into the permeate and the concentrate mentioned in the introduction. While the permeate enters into the permeate collecting tube and is removed via the latter, the concentrate exits from the first end side of the cylindrical winding.

In this alternative example, it is furthermore preferable for the first end side of the wound reverse osmosis membrane to be coupled via the adaptor to the outlet opening for the concentrate. For this purpose, the adaptor provides a suitable outlet channel, via which concentrate exiting from the first end side is supplied to the outlet opening. Consequently, concentrate exiting from the first end side is able to depart via the outlet opening from the reverse osmosis device in the direction of the outlet, integrated into the base unit, for the concentrate.

It is furthermore preferable for the permeate collecting tube to be coupled via the adaptor to the outlet opening for the permeate in the top part of the pressure vessel. For this purpose, the adaptor provides a suitable outlet channel that connects the permeate collecting tube to the outlet opening. Consequently, permeate entering into the permeate collecting tube is able to depart via the outlet opening from the reverse osmosis device in the direction of the outlet, integrated into the base unit, for the permeate.

Preferably, the apparatus, in particular the base unit that is able to be installed in a positionally fixed manner, comprises a blending device by way of which permeate exiting from the reverse osmosis device can be mixed with the salt-containing water, in particular with the tap water, particularly preferably can be mixed in a regulable mixing ratio.

Preferably, the blending device is integrated into the apparatus.

The blending device may comprise, for example, a valve-controlled passage in a line within the base part, which line connects the inlet for the salt-containing water and the permeate outlet.

As a rule, the blending device is in the form of a valve.

Preferably, the blending device comprises a channel delimited by a wall. The wall of the channel preferably in turn has at least one aperture, through which liquid can enter into the channel.

Particularly preferably, the wall has multiple, in particular two to five, apertures. They may each have the same cross section. In some examples, however, it is also possible for the cross sections of the apertures to differ from one another. It is furthermore preferable for the apertures in the wall to be arranged along an axially oriented line, preferably at regular intervals.

The apertures may, for example, be bores or slots.

The liquid is in particular salt-containing water branched off from the water that has flowed via the inlet into the apparatus before this is fed via the likewise aforementioned inlet opening into the reverse osmosis device.

The channel is preferably at least regionally, particularly preferably over its entire length, of rotationally symmetrical, in particular cylindrical, form.

It is furthermore preferable for the blending device to comprise a valve body mounted in an axially displaceable and/or rotationally movable manner within the channel.

Preferably, the valve body has a sealing region that, in a manner dependent on the position of the valve body, can completely or partially block the throughflow of liquid through the at least one aperture. For this purpose, the sealing region may comprise, for example, two O-type sealing rings spaced apart from one another where each bears against the wall of the channel in a liquid-tight manner.

If the valve body is positioned in the channel such that the at least one aperture opens into the channel between the two O-type sealing rings, then the throughflow of liquid through the at least one aperture is blocked. If, as a consequence of axially displacing the valve body, one or more of the apertures are situated in a channel portion above or below the two O-type sealing rings, then the throughflow is free to a limited extent or completely free.

Particularly preferably, the blending device is not integrated into the base part but is formed at a boundary surface between the base unit and the exchangeable unit. In this example, the valve body is preferably a constituent part of the base unit. The channel is, together with the wall delimiting the channel, preferably a constituent part of the exchangeable unit. With each replacement of the reverse osmosis device, the valve body is thus inserted into the channel.

The channel preferably has an inlet coupled to the permeate collecting tube, and an outlet coupled to the outlet for the permeate. In other words, permeate preferably flows through the channel. Even more preferably, the permeate is mixed in the channel with salt-containing water entering through the at least one aperture into the channel.

Further preferably, the valve body may be of hollow cylindrical form. In these examples, the valve body has a central passage with an inlet at one end of the valve body and with an outlet at the other end of the valve body. It is preferable for the outlet of the central passage to be coupled to the outlet, integrated into the base unit, for the concentrate. Alternatively, the outlet of the central passage may also be the outlet, integrated into the base unit, for the concentrate. The inlet of the central passage is preferably coupled to the outlet opening for the concentrate, in particular is inserted into the outlet opening. In other words, concentrate preferably flows through the valve body in these examples.

It is preferable for the position of the valve body within the channel to be able to be set by a positioning element that brings about an axial displacement of the valve body within the channel.

Preferably, the positioning element is seated rotatably on a thread and, when rotated, undergoes a displacement in an axial direction. Particularly preferably, the positioning element is in this example coupled to the valve body such that a displacement of the positioning element in an axial direction brings about an axial displacement of the valve body.

Particularly preferably, the positioning element is in the form of a rotatable cap.

Alternatively, the position of the valve body within the channel is able to be set by a positioning element that brings about a rotation of the valve body within the channel. Particularly preferably, the positioning element connects in a rotationally conjoint manner to the valve body.

Alternatively, the apparatus, in particular the base unit that is able to be installed in a positionally fixed manner, comprises a blending device by way of which permeate exiting from the reverse osmosis device can be mixed with the concentrate, particularly preferably can be mixed in a regulable mixing ratio.

This blending device may in particular involve a valve-controlled passage in a line within the base part, which line connects the concentrate outlet and the permeate outlet.

Further preferably, the apparatus, in particular the base unit that is able to be installed in a positionally fixed manner, comprises a regulating apparatus that controls and/or regulates a throughflow quantity of the permeate, and/or concentrate, exiting from the reverse osmosis device. Particularly preferably, the throughflow quantity of the concentrate is varied for the purpose of controlling and/or regulating the throughflow quantity of the permeate exiting from the reverse osmosis device. If the throughflow quantity of the concentrate is reduced, then this generally automatically leads to an increase in the quantity of permeate flowing through the outlet for the permeate. The regulating apparatus may in particular be a manually actuable or automatically activatable valve.

Each method of treating salt-containing water by reverse osmosis realized by using an apparatus is encompassed by this disclosure.

Further features and advantages will emerge from the following description of a number of preferred examples.

FIG. 1 is a schematic cross-sectional illustration of a preferred example of an apparatus 100. This comprises a base unit 101 installed in a positionally fixed manner, and a reverse osmosis device as an exchangeable unit 102. The reverse osmosis device has a pressure housing 103 composed of plastic having a bottom 103a and a top part 103b. In the pressure housing 103, there is arranged a reverse osmosis membrane in the form of a cylindrical winding 104 having having a first end side 104a and a second end side 104b. The permeate collecting tube 105 is situated at the center of the winding.

The winding 104 is coupled to the top part 103b via the adaptor 106. The adaptor 106 provides entrances and exits for water entering into the reverse osmosis device 102 and permeate and concentrate exiting from the reverse osmosis device 102, specifically the inlet opening 107, the outlet opening 108 and the outlet opening 109. Furthermore, the adaptor provides the inlet channel 107a and the outlet channels 108a and 109a, of which the channel 108a connects the outlet opening 108 to the permeate collecting tube 105, while concentrate formed in the reverse osmosis device is supplied via the outlet channel 109a to the outlet opening 109.

The exchangeable unit 102 connects to the base unit 101 by screwing. For this purpose, the base unit 101 has the inner thread 110, and the exchangeable unit 102 has the outer thread 111. In the region of the outlet openings 108 and 109, the seals 112 and 114 are positioned between the base unit 101 and the exchangeable unit 102. There is a further seal 113 in the region of the thread 110 or 111.

The base unit 101 comprises an inlet 115 for salt-containing water to be treated in the exchangeable unit 102, an outlet 116 for permeate formed in the exchangeable unit, and an outlet 117 for concentrate formed in the exchangeable unit 102. If, as shown, the exchangeable unit 102 is screwed into the base unit 101, then the inlet 115 is coupled to the inlet opening 107, the outlet 116 is coupled to the outlet opening 108 and the outlet 117 is coupled to the outlet opening 109.

The base unit 101 may also comprise the blending devices/device 118 and/or 123 and, if appropriate, the regulating apparatus 119. By the blending device 118, permeate exiting from the reverse osmosis device 102 can be mixed with salt-containing water entering via the inlet 115 into the base unit 101. By the blending device 123, permeate exiting from the reverse osmosis device 102 can be mixed with concentrate. By the regulating apparatus 119, the throughflow quantity of the concentrate exiting from the reverse osmosis device 102, and thus indirectly the formation of permeate in the reverse osmosis device 102, can be regulated.

The flow direction of the water to be treated, or the formed permeate and concentrate, inside the apparatus 100 is illustrated by arrows. During operation, salt-containing water enters via the inlet 115 into the base unit 101. From there, the water is fed via the inlet opening 107 into the reverse osmosis device 102. Therein, the water flows via the inlet channel 107a and via a gap between the casing 121 of the cylindrical winding 104 and the inner wall 122 of the pressure vessel to the second end side 104b and then flows through the winding axially in the direction of the first end side 104a, wherein the formation of permeate and concentrate occurs. While the permeate is removed via the permeate collecting tube 105, the concentrate exits from the first end side 104a of the cylindrical winding 104. Permeate from the permeate collecting tube 105 can enter in an upward direction through the channel 108a and via the outlet opening 108 into the base unit 101. Here, the permeate passes into an annular cavity 120, which is enclosed by the base unit 101 and the exchangeable unit 102. From there, the permeate is supplied to the outlet 116. Concentrate exiting from the first end side 104a of the cylindrical winding 104 flows via the outlet channel 109a to the outlet opening 109 that opens into the base unit 101. There, it is supplied to the outlet 117. The quantity of the concentrate exiting from the outlet 117 can be regulated by the regulating apparatus 119, which is generally a valve.

Figure 2:
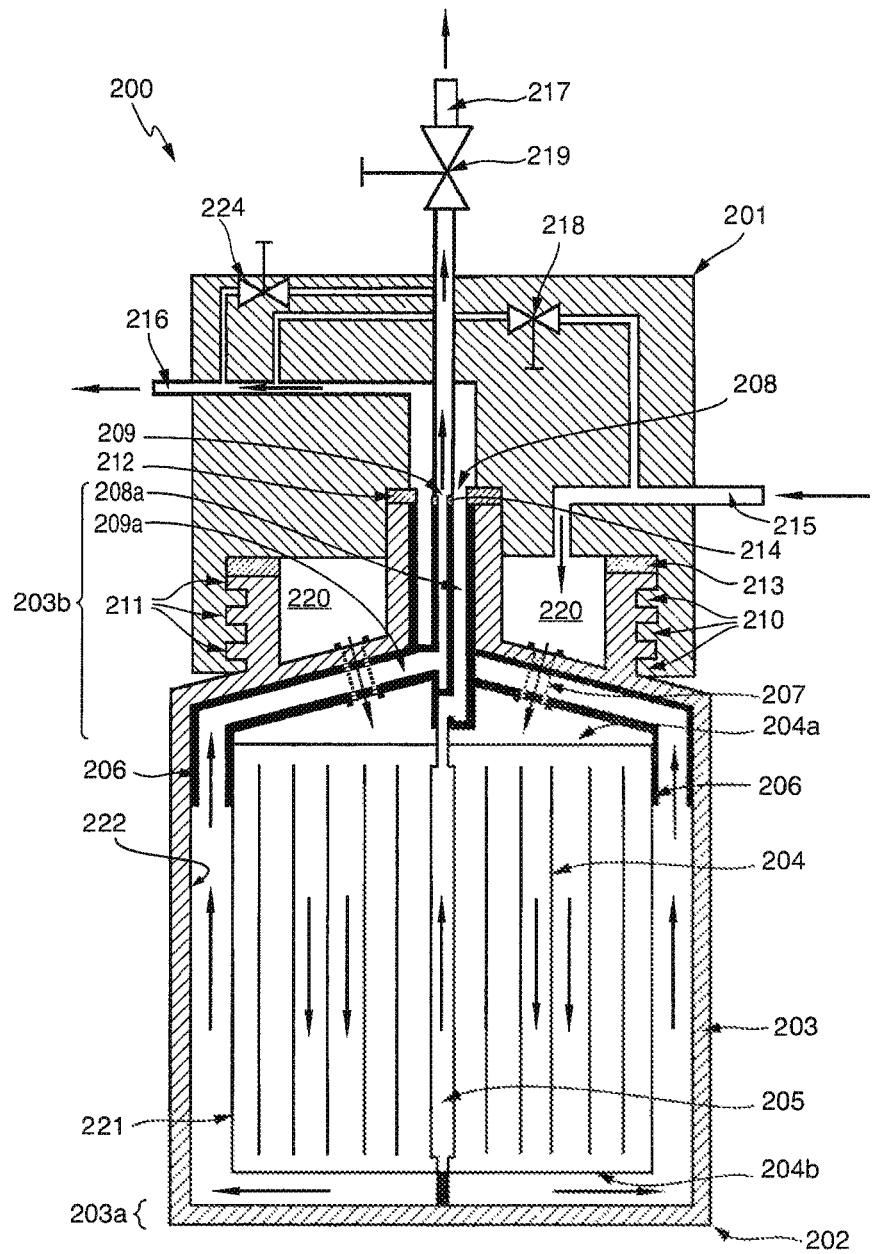
FIG. 2 is a schematic cross-sectional illustration of a preferred example of an apparatus.

FIG. 2 is a schematic cross-sectional illustration of a preferred example of an apparatus 200. This comprises a base unit 201 installed in a positionally fixed manner, and a reverse osmosis device as an exchangeable unit 202. The reverse osmosis device has a pressure housing 203 composed of plastic having a bottom 203a and a top part 203b. In the pressure housing 203, there is arranged a reverse osmosis membrane in the form of a cylindrical winding 204 having a first end side 204a and a second end side 204b. The permeate collecting tube 205 is situated at the center of the winding.

The winding 204 is coupled to the top part 203b via the adaptor 206. The adaptor 206 provides entrances and exits for water entering into the reverse osmosis device 202 and permeate and concentrate exiting from the reverse osmosis device 202, specifically the inlet opening 207, the outlet opening 208 and the outlet opening 209. Furthermore, the adaptor provides the outlet channels 208a and 209a, of which the channel 208a connects the outlet opening 208 to the permeate collecting tube 205, while concentrate formed in the reverse osmosis device is supplied via the outlet channel 209a to the outlet opening 209.

The exchangeable unit 202 connects to the base unit 201 by screwing. For this purpose, the base unit 201 has the inner thread 210, and the exchangeable unit 202 has the outer thread 211. In the region of the outlet openings 208 and 209, the seals 212 and 214 are positioned between the base unit 201 and the exchangeable unit 202. There is a further seal 213 in the region of the thread 210 or 211.

The base unit 201 comprises an inlet 215 for salt-containing water to be treated in the exchangeable unit 202, an outlet 216 for permeate formed in the exchangeable unit, and an outlet 217 for concentrate formed in the exchangeable unit 202. If, as shown, the exchangeable unit 202 is screwed into the base unit 201, then the inlet 215 is coupled to the inlet opening 207, the outlet 216 is coupled to the outlet opening 208 and the outlet 217 is coupled to the outlet opening 209.

The base unit 201 may also comprise the blending devices/device 218 and/or 224 and, if appropriate, the regulating apparatus 219. By the blending device 218, permeate exiting from the reverse osmosis device 202 can be mixed with salt-containing water entering via the inlet 215 into the base unit 201. By the blending device 224, permeate exiting from the reverse osmosis device 202 can be mixed with concentrate. By the regulating apparatus 219, the through-flow quantity of the concentrate exiting from the reverse osmosis device 202, and thus indirectly the formation of permeate in the reverse osmosis device 202, can be regulated.

The flow direction of the water to be treated, or the formed permeate and concentrate, inside the apparatus 200 is illustrated by arrows. During operation, salt-containing water enters via the inlet 215 into the base unit 201 and, therein, then enters into the annular cavity 220 enclosed by the base unit 201 and the exchangeable unit 202. From there, the water is fed via the inlet opening 207 into the reverse osmosis device 202. Therein, the water flows to the first end side 204a and then flows through the winding axially in the direction of the second end side 204b, wherein the formation of permeate and concentrate occurs. While the permeate is removed via the permeate collecting tube 205, the concentrate exits from the second end side 204b of the cylindrical winding 204. Permeate from the permeate collecting tube 205 can enter in an upward direction through the channel 208a and via the outlet opening 208 into the base unit 201. Therein, the permeate is supplied to the outlet 216. Concentrate exiting from the second end side 204b of the cylindrical winding 204 enters via a gap between the casing 221 of the cylindrical winding 204 and the inner wall 222 of the pressure vessel into the channel 209a in the adaptor 206, which channel opens via the outlet opening 209 into the base unit 201. There, it is supplied to the outlet 217. The quantity of the concentrate exiting from the outlet 217 can be regulated by the regulating apparatus 219.

Figure 3A:
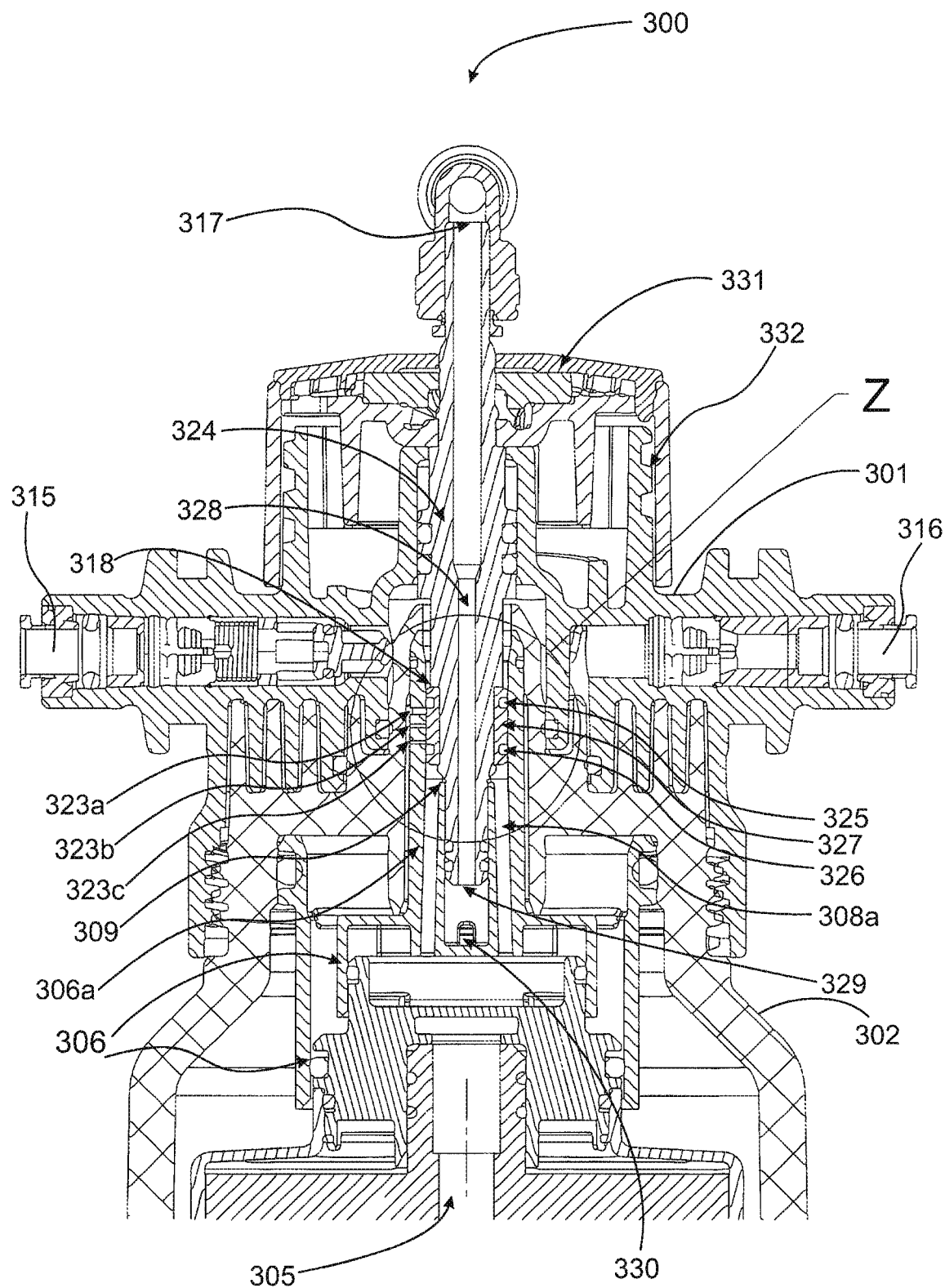
FIG. 3A is a schematic cross-sectional illustration of a preferred example of an apparatus.

FIG. 3A is a schematic cross-sectional illustration of a preferred example of an apparatus 300. The illustration serves primarily as an example of an apparatus comprising a blending device 318 by way of which permeate can be mixed with salt-containing water and which is formed at a boundary surface between the base unit 301 and the reverse osmosis device formed as an exchangeable unit 302. Consequently, of the exchangeable unit 302, only the upper part, including the adaptor 306, is illustrated.

The illustrated base unit 301 comprises the inlet 315 for salt-containing water to be treated in the exchangeable unit 302, an outlet 316 for permeate formed in the exchangeable unit, and an outlet 317 for concentrate formed in the exchangeable unit 302.

The blending device 318 comprises the channel 308a, which is delimited by the wall 306a. The channel 308a is, together with the wall 306a delimiting the channel, a constituent part of the exchangeable unit 302.

Permeate formed in the exchangeable unit 302 flows through the channel 308a. For this purpose, the channel has an inlet coupled to the permeate collecting tube 305, and an outlet coupled to the outlet 316 for the permeate. Both the inlet and the outlet are not visible in the illustrated section plane. This, however, also is not necessary for the elucidation of the function of the blending device 318.

By contrast, the apertures 323a, 323b and 323c are essential for the function of the blending device 318. By way of the apertures, salt-containing water entering via the inlet 315 into the base unit 301 can be fed into the channel 308a and mixed with permeate. The flow path of the salt-containing water proceeding from the inlet 315 as far as the apertures 323a, 323b and 323c is not continuously visible in the illustrated section plane, this too however not being necessary for the elucidation of the function of the blending device 318.

The apertures 323b and 323c are bores with identical cross section. The aperture 323a is a slot whose cross section is larger than the cross section of the apertures 323b and 323c by a multiple. The three apertures are arranged along an axially oriented line.

The channel 308a delimited by the wall 306a is preferably of cylindrical form substantially over its entire length. The valve body 324 is arranged within the channel 308a. The valve body is mounted in an axially displaceable manner within the channel 308a.

The valve body 324 is a constituent part of the base unit.

The valve body 324 has a sealing region 327 defined by the O-type sealing rings 325 and 326 and which, in a manner dependent on the position of the valve body, can completely or partially block the throughflow of salt-containing water through the apertures 323a, 323b and 323c. The O-type sealing rings 325 and 326 each bear against the wall 306a of the channel 308a in a liquid-tight manner. In the positioning illustrated, all three apertures 323a, 323b and 323c open into the channel within the sealing region 327. The throughflow of salt-containing water through the apertures 323a, 323b and 323c is therefore blocked.

If, however, the valve body 324 in the channel 308a is displaced axially in an upward direction such that one or more of the apertures 323a, 323b and 323c open into the channel in a channel portion below the two O-type sealing rings 325 and 326, then the throughflow is free to a limited extent or completely free.

The illustrated valve body 324 is of hollow cylindrical form. It has a central passage 328 with an inlet 329 at one end of the valve body 324 and with an outlet at the other end of the valve body 324. The outlet of the central passage 328 is the aforementioned outlet 317 for the concentrate. The inlet 329 of the central passage 328 is inserted into the outlet opening 309 for the concentrate. Concentrate is fed into the passage 328 via the inflow 330. The concentrate is then removed through the valve body 324.

The position of the valve body 324 within the channel 308a is able to be set by positioning element 331 that is seated rotatably on a thread 332. A rotation of the positioning element 331 necessarily leads to an axial displacement of the valve body 324 within the channel too since the positioning element 331 and the valve body 324 fixedly connect to one another. In this example, the positioning element 331 is in the form of a rotatable cap that provides protection for the top side of the base unit 301.

Figure 3B:
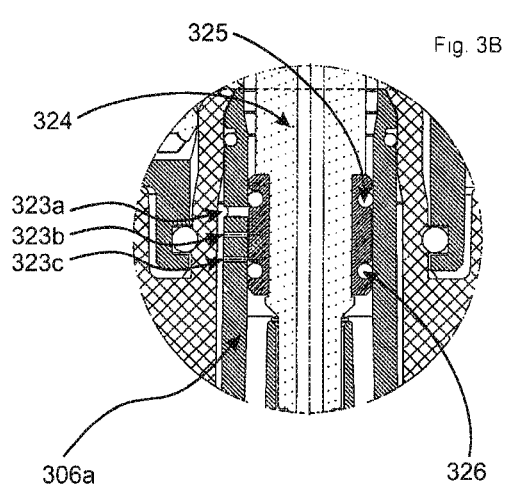
FIGS. 3B-3E show enlarged examples of detail Z from FIG. 3A.

The detail Z from FIG. 3A is illustrated on an enlarged scale in FIG. 3B. Here, the valve body 324 is in a blocking position.

Figure 3C:
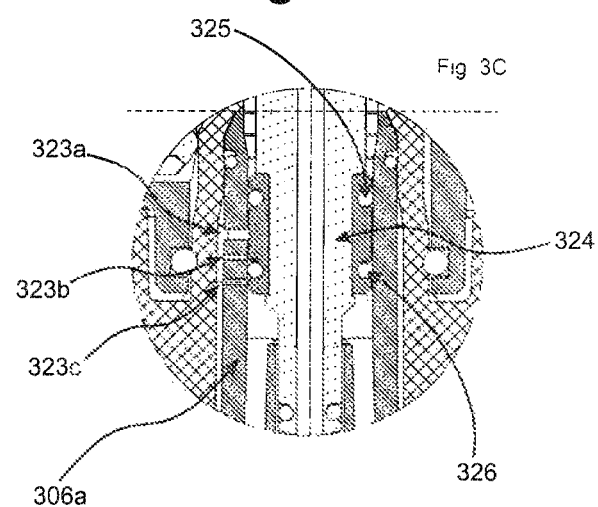

FIG. 3C shows the detail Z when the valve body 324 is switched to partial passage. Salt-containing water can enter through the bore 323c into the channel 308a and, there, mix with permeate. The mixing ratio is determined inter alia by the cross section of the bore 323c. The bore 323b and the slot 323a are blocked.

Figure 3D:
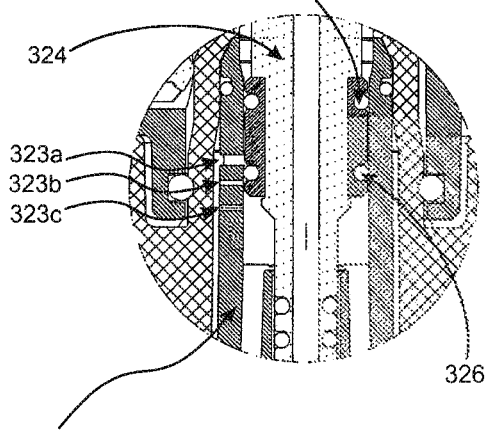

FIG. 3D shows the detail Z in further examples in which the valve body 324 is switched to partial passage. In these further examples, salt-containing water can enter through the bores 323b and 323c into the channel 308a. The slot 323a is blocked.

Figure 3E:
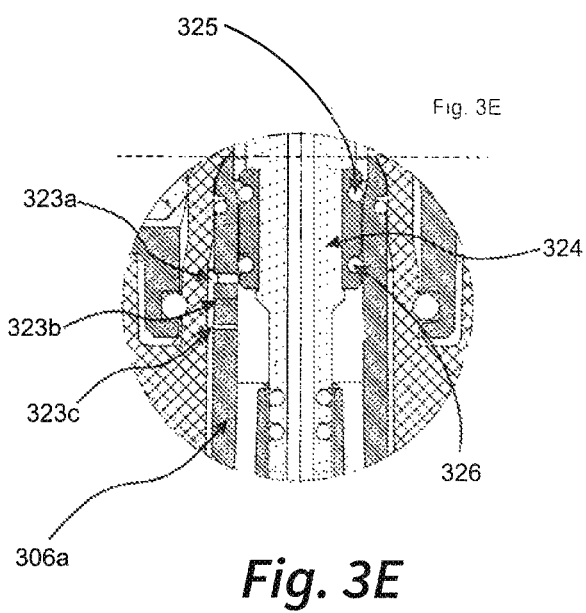

FIG. 3E shows the detail Z when the valve body 324 is switched to full passage. In these further examples, salt-containing water can enter through the bores 323b and 323c and through the slot 323a into the channel 308a. If the bores 323b and 323c and the slot 323a have a sufficiently large cross section, it is possible for salt-containing water entering into the inlet 315 to also be fully guided past the reverse osmosis device 302 (bypass switching). This may be necessary, for example, if the membrane of the reverse osmosis device 302 is clogged with impurities and it blocks.

The invention claimed is:

1. An apparatus that treats salt-containing water by reverse osmosis, in which the salt-containing water is separated into a permeate stream and a concentrate stream, comprising:
   an inlet for the salt-containing water;
   an outlet for the permeate;
   an outlet for the concentrate,
   a reverse osmosis device, and
   a blending device comprising a channel delimited by a wall; and
   a valve body mounted in an axially displaceable and/or rotationally movable manner within the channel;
   wherein
   the inlet and the outlets are integrated into a base unit adapted for installation in a fixed position,
   the reverse osmosis device is an exchangeable unit detachably connected to the base unit,
   the valve body is a constituent part of the base unit, and
   the valve body is, together with the wall delimiting the channel, a constituent part of the exchangeable unit.

2. The apparatus as claimed in claim 1, wherein the base unit has a receptacle for the exchangeable unit.

3. The apparatus as claimed in claim 1, further comprising at least one of:
   the exchangeable unit comprises a pressure vessel as part of the reverse osmosis device;
   a pressure vessel is cylindrical and has a bottom and a top part;
   the bottom of the pressure vessel is closed;
   an inlet opening for the salt-containing water, an outlet opening for the permeate and an outlet opening for the concentrate are integrated into the top part of the pressure vessel;
   the inlet opening is coupled to the inlet for the salt-containing water;
   the outlet opening for the permeate is coupled to the outlet for the permeate; and
   the outlet opening for the concentrate is coupled to the outlet for the concentrate.

4. The apparatus as claimed in claim 3, wherein the reverse osmosis device comprises a reverse osmosis membrane wound around a perforated tube for the collection and removal of the permeate and is a cylindrical winding having two end-side ends and thus a first and a second end side.

5. The apparatus as claimed in claim 3, further comprising at least one of:
   an adaptor is mounted on the first end side of the wound reverse osmosis membrane, via which adaptor the reverse osmosis membrane is, together with the permeate collecting tube, coupled to the top part of the pressure vessel;
   by the adaptor, the second end side of the reverse osmosis membrane is coupled to the inlet opening for the water;
   by the adaptor, a perforated tube is coupled to the outlet opening for the permeate; and
   by the adaptor, the first end side of the wound reverse osmosis membrane is coupled to the outlet opening for the concentrate.

6. The apparatus as claimed in claim 1, further comprising a blending device by way of which permeate exiting from the reverse osmosis device can be mixed with the salt-containing water and/or concentrate.

7. The apparatus as claimed in claim 6, further comprising at least one of:
the blending device is integrated into the apparatus;
the blending device is a constituent part of the base unit; and
the blending device is formed at a boundary surface between the base unit and the exchangeable unit.

8. The apparatus as claimed in claim 6, further comprising at least one of:
the blending device is a valve;
the wall of the channel has at least one aperture through which liquid or the salt-containing water can enter into the channel;
and
the valve body has a sealing region that, in a manner dependent on the position of the valve body, can completely or partially block throughflow of liquid through the at least one aperture.

9. The apparatus as claimed in claim 8, further comprising at least one of:
the channel has an inlet coupled to a perforated tube, and an outlet coupled to the outlet for the permeate;
the valve body is a hollow cylinder and has a central passage with an inlet at one end of the valve body and with an outlet at the other end of the valve body;
the outlet of the central passage is coupled to the outlet, integrated into the base unit, for the concentrate; and
the inlet of the central passage is coupled to the outlet opening for the concentrate or inserted into said outlet opening.

10. The apparatus as claimed in claim 8, further comprising at least one of:
the position of the valve body within the channel is able to be set by a positioning element that brings about an axial displacement of the valve body within the channel;
the positioning element is rotatably seated on a thread and, when rotated, undergoes a displacement in an axial direction;
the positioning element is coupled to the valve body such that a displacement of the positioning element in an axial direction brings about an axial displacement of the valve body; and
the positioning element is a cap.

11. The apparatus as claimed in claim 8, further comprising at least one of:
the position of the valve body within the channel is able to be set by a positioning element that brings about a rotation of the valve body within the channel; and
the positioning element is connected in a rotationally conjoint manner to the valve body.

12. The apparatus as claimed in claim 1, further comprising a regulating apparatus that controls and/or regulates a throughflow quantity of the permeate, and/or concentrate, exiting from the reverse osmosis device.

13. The apparatus as claimed in claim 7, further comprising at least one of:
the wall of the channel has at least one aperture through which liquid or the salt-containing water can enter into the channel;
and
the valve body has a sealing region that, in a manner dependent on the position of the valve body, can completely or partially block throughflow of liquid through the at least one aperture.

14. The apparatus as claimed in claim 9, further comprising at least one of:
the position of the valve body within the channel is able to be set by a positioning element that brings about an axial displacement of the valve body within the channel;
the positioning element is rotatably seated on a thread and, when rotated, undergoes a displacement in an axial direction;
the positioning element is coupled to the valve body such that a displacement of the positioning element in an axial direction brings about an axial displacement of the valve body; and
the positioning element is a cap.

15. The apparatus as claimed in claim 9, further comprising at least one of:
the position of the valve body within the channel is able to be set by a positioning element that brings about a rotation of the valve body within the channel; and
the positioning element is connected in a rotationally conjoint manner to the valve body.

16. The apparatus as claimed in claim 1, wherein the base unit has a receptacle into which the exchangeable unit can be screwed.

* * * * *